(12) United States Patent
Szasz

(10) Patent No.: US 11,206,347 B2
(45) Date of Patent: Dec. 21, 2021

(54) OBJECT-TRACKING BASED SLOW-MOTION VIDEO CAPTURE

(71) Applicant: SONY CORPORATION, Tokyo (JP)

(72) Inventor: Pal Szasz, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/619,616

(22) PCT Filed: Jun. 5, 2017

(86) PCT No.: PCT/US2017/035917
§ 371 (c)(1),
(2) Date: Dec. 5, 2019

(87) PCT Pub. No.: WO2018/226203
PCT Pub. Date: Dec. 13, 2018

(65) Prior Publication Data
US 2020/0162665 A1     May 21, 2020

(51) Int. Cl.
*H04N 5/232* (2006.01)
*G06T 7/246* (2017.01)
(Continued)

(52) U.S. Cl.
CPC ......... *H04N 5/23218* (2018.08); *G06T 7/246* (2017.01); *G06T 7/269* (2017.01);
(Continued)

(58) Field of Classification Search
None
See application file for complete search history.

(56) References Cited

U.S. PATENT DOCUMENTS

| 5,034,811 A | 7/1991 | Palm |
| 9,663,227 B1 * | 5/2017 | Lema .................... B64C 39/024 |

(Continued)

FOREIGN PATENT DOCUMENTS

| EP | 2076022 | 1/2009 |
| EP | 2076023 | 1/2009 |
| JP | 2005250989 A | 9/2005 |

OTHER PUBLICATIONS

Notification of Transmittal of the International Search Report and the Written Opinion of the Intl. Searching Authority, or the declaration; 15 pages; dated Aug. 17, 2017; PCT/US2017/035917.

(Continued)

*Primary Examiner* — Talha M Nawaz
(74) *Attorney, Agent, or Firm* — Tucker Ellis LLP

(57) ABSTRACT

Triggering slow-motion video capture based on object tracking includes receiving user input defining a trigger area on the viewfinder of a digital camera and tracking the movement of an actor in the field of view of the camera. A determination is made that the actor's movement has positioned the actor within the boundaries of the defined trigger area. Slow-motion video capture is initiated based on the determination. Feature detection methods may be used to identify feature points, where some of the feature points correspond to the actor. Additionally, feature point tracking methods may be used to track the movement of the feature points corresponding to the actor. Statistical methods may be used to remove outlier feature points. The trigger area may be tracked and its position updated in order to anchor the trigger window to stationary objects in the field of view of the digital camera.

17 Claims, 10 Drawing Sheets

(51) Int. Cl.
*G06T 7/269* (2017.01)
*H04N 5/262* (2006.01)

(52) U.S. Cl.
CPC ..... *H04N 5/23216* (2013.01); *H04N 5/23293* (2013.01); *H04N 5/2621* (2013.01); *G06T 2207/10016* (2013.01); *G06T 2207/30196* (2013.01)

(56) References Cited

U.S. PATENT DOCUMENTS

| | | | | |
|---|---|---|---|---|
| 2003/0215216 A1* | 11/2003 | Hashimoto | ......... | H04N 5/9205 386/344 |
| 2004/0130567 A1* | 7/2004 | Ekin | ................. | G11B 27/034 715/723 |
| 2005/0196017 A1* | 9/2005 | Altherr | ................. | G06T 7/246 382/103 |
| 2009/0167889 A1* | 7/2009 | Onodera | ............ | H04N 5/23222 348/222.1 |
| 2009/0167890 A1* | 7/2009 | Nakagomi | ......... | H04N 5/23222 348/222.1 |
| 2010/0107080 A1* | 4/2010 | Bentley | ................ | G11B 27/031 715/723 |
| 2010/0265344 A1 | 10/2010 | Velarde et al. | | |
| 2011/0157667 A1* | 6/2011 | Lacoste | ................ | G03H 1/2205 359/9 |
| 2011/0234834 A1 | 9/2011 | Sugimoto | | |
| 2011/0305277 A1* | 12/2011 | Fu | ......................... | H04N 19/44 375/240.12 |
| 2015/0256749 A1 | 9/2015 | Frey et al. | | |
| 2016/0045785 A1* | 2/2016 | Tzovanis | .......... | G06Q 10/0639 700/91 |
| 2017/0368461 A1* | 12/2017 | Ceraldi | ................ | A63F 13/5258 |
| 2018/0091728 A1* | 3/2018 | Brown | ................. | G06F 3/0488 |
| 2018/0330759 A1* | 11/2018 | Funakoshi | ............ | H04N 5/783 |

OTHER PUBLICATIONS

Office Action from corresponding Japanese Application No. 2019-566896 dated Dec. 8, 2020.

* cited by examiner

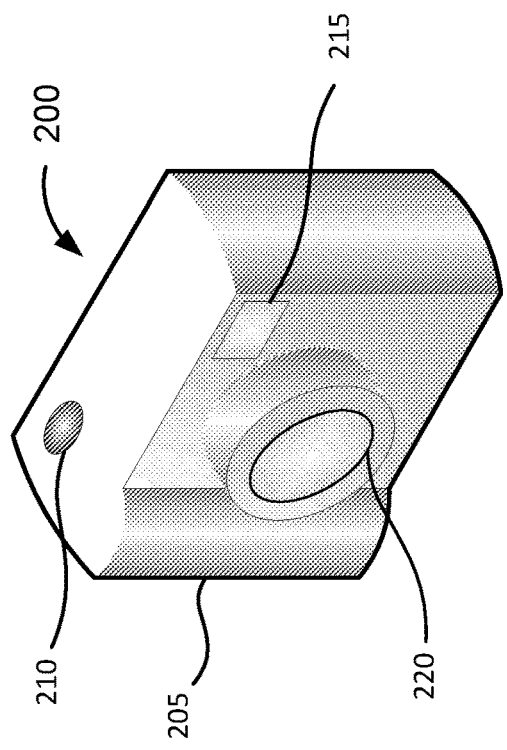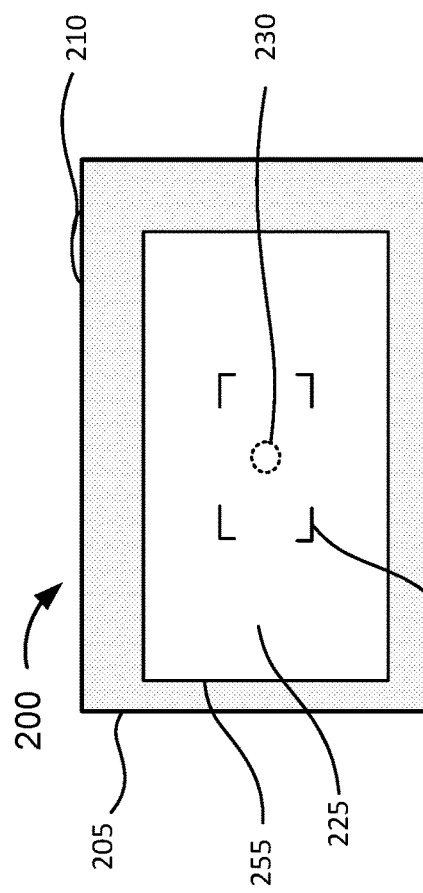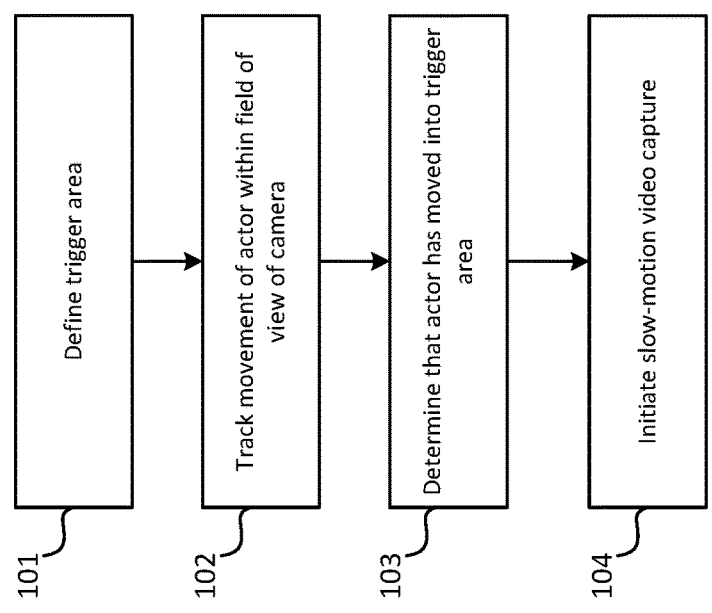

OBJECT-TRACKING BASED SLOW-MOTION VIDEO CAPTURE

TECHNICAL FIELD

The present disclosure relates generally to electronic devices and, more particularly, to digital cameras configured to capture slow-motion video.

BACKGROUND ART

Digital cameras have become ubiquitous in modern life. Innovation and competition have made high-quality digital cameras affordable and accessible to nearly everyone. In addition to standalone digital cameras, many personal electronic devices now include digital cameras incorporated directly into the device. For instance, nearly all smart phones and tablet computing devices now include an integrated digital camera capable of capturing video and still images. Additionally, many compact personal electronic devices, such as watches, media players, head-worn devices such as glasses, laptop computers, etc., now also include integrated digital cameras.

Modern digital cameras, including those incorporated into personal electronic devices, are incredibly feature rich. Despite many having a small form factor, these cameras are generally capable of capturing high-resolution images, and often include powerful editing tools as part of the operating software of the camera or the host device. One feature that has become popular on modern digital cameras is the ability to capture video image frames at a high rate and display the frames at a slower frame rate to produce a slow-motion video effect. Challenges exist, however, in the capturing of video for the purpose of slow-motion playback, and especially in the capture of video for the purpose of extreme slow-motion playback, which requires capturing video image frames at an extremely high rate. As used herein, the term "slow-motion video" refers to video captured for the purpose of playback in which events in the video occur slower than they occurred at the time of capture.

One such challenge surrounding the capture of slow-motion video is the effort required by a user to initiate the high frame rate capture required for slow-motion video. For example, many digital cameras with a slow-motion video capture feature require user input to start a high frame rate capture necessary for slow-motion video. A user may have to, e.g., press a hard or soft button at the time the user would like the slow-motion video to be captured.

Required user interaction in the capture of slow-motion video, such as that described above, introduces limitations to the slow-motion video capture feature of the camera. For example in some cameras, especially those capable of capturing extreme slow-motion video (e.g., video captured at frame rates of 960 frames per second (fps), or higher), user input to initiate slow-motion video capture is necessary due to hardware limitations of the camera itself. In these cases, the frame capture rate for slow-motion video is so high that the video buffer fills in a very short amount of time. Therefore, only a very short amount of slow-motion video can be captured (e.g., several seconds). User interaction is therefore necessary to initiate slow-motion video capture at a specific time in order to record the desired event within the time window that the slow-motion video buffer provides.

In other cameras, where longer periods of slow-motion video can be captured, a user interested in capturing slow-motion video may only want specific parts of the video to be captured in slow-motion—otherwise, a relatively short video having uninteresting segments can become too long. For instance, a user may want to capture a specific action in slow-motion (such as a trick or complicated maneuver performed by an athlete), while leaving mundane parts of the video (such as the initial run of a skier performing a jump) to play back at normal speed.

In such a scenario, a user can have a very short window of time relative to the action the user would like to capture in slow-motion to perform the required user input to initiate a slow-motion recording feature. If the user performs the required user input before the window, the slow-motion video will be too long and will capture unwanted footage in slow-motion. If the user performs the required user input after the window, a part of the desired footage will not be captured in slow-motion.

Additionally, requiring user interaction to initiate slow-motion video precludes the capturing of unattended slow-motion video—for instance, where a camera is left on a tripod or other mounting surface.

SUMMARY

According to one aspect of the disclosure, disclosed is a digital camera. The digital camera includes a control circuit that operatively controls the digital camera to: receive a user input defining boundaries of a trigger area on a viewfinder of the digital camera; track movement of an actor captured by the camera in video frames; determine that the actor has moved inside the boundaries of the trigger area, and initiate slow-motion video capture in response to the determination that the actor has moved inside the boundaries of the trigger area.

According to one embodiment of the digital camera, the video frames are processed according to a feature detection method, and the feature detection method identifies feature points that correspond to objects captured in the video frames.

According to one embodiment of the digital camera, the video frames are processed according to a feature detection method, and the feature detection method identifies feature points that correspond to objects captured in the video frames.

According to one embodiment of the digital camera, a threshold number of feature points are required to be inside the boundaries of the trigger area to initiate slow-motion video.

According to one embodiment of the digital camera, the digital camera identifies the feature points as one of moving feature points or fixed feature points.

According to one embodiment of the digital camera, the threshold number of feature points is defined as including a percentage of the feature points identified as moving feature points.

According to one embodiment of the digital camera, the threshold number of feature points is further defined as including a minimum number of feature points.

According to one embodiment of the digital camera, the digital camera positively identifies the actor as a discrete set of the feature points identified as moving feature points.

According to one embodiment of the digital camera, the digital camera positively identifies the actor as a discrete set of the feature points identified as moving feature points, and wherein the threshold number of feature points is defined as a percentage of the discrete set.

According to one embodiment of the digital camera, the movement of the actor is tracked by a feature point tracking method that tracks movement of a plurality of feature points that correspond to the actor.

According to one embodiment of the digital camera, the feature detection method comprises the features from accelerated segment test (FAST) corner detection method.

According to one embodiment of the digital camera, the feature point tracking method comprises the features from accelerated segment test (FAST) corner detection method.

According to one embodiment of the digital camera, the video frames are processed according to an optical flow method.

According to one embodiment of the digital camera, the optical flow method predicts the position of a lost feature point in a video frame where the feature point tracking method failed to identify the lost feature point.

According to one embodiment of the digital camera, the optical flow method comprises the Kanade-Lucas-Tomasi (KLT) method.

According to one embodiment of the digital camera, the control circuit controls the camera to determine an initial position of the trigger area relative to a reference point.

According to one embodiment of the digital camera, the control circuit controls the camera to identify one or more of the feature points as outliers, and wherein the feature points identified as outliers are ignored in determining the threshold number of feature points.

According to one embodiment of the digital camera, the control circuit controls the camera to track the position of the trigger area, and determine, based on the tracked position of the trigger area, that the trigger area is displaced from the initial position of the trigger area relative to the reference point.

According to one embodiment of the digital camera, the position of the trigger area is adjusted to reflect the initial position of the trigger area relative to the reference point.

According to one embodiment of the digital camera, the reference point is determined based on an at least one of the feature points identified as a fixed feature point.

According to one aspect of the disclosure, disclosed is a method carried out on a digital camera, the method comprising the steps of tracking movement of an actor captured by the digital camera in video frames; determining that the actor has moved inside the boundaries of a trigger area defined on a viewfinder of the digital camera, and initiating slow-motion video capture in response to the determination that the actor has moved inside the boundaries of the trigger area.

According to one embodiment of the method, the method includes accepting, by the digital camera, user input that defines the trigger area on the viewfinder of the digital camera.

According to one embodiment of the method, the method includes processing the video frames according to a feature detection method, wherein the feature detection method identifies feature points that correspond to objects captured in the video frames.

According to one embodiment of the method, a threshold number of feature points are required to be inside the boundaries of the trigger area to initiate slow-motion video.

According to one embodiment of the method, the method includes identifying the feature points as one of moving feature points or fixed feature points.

According to one embodiment of the method, the method includes defining the threshold number of feature points as including a percentage of the feature points identified as moving feature points.

According to one embodiment of the method, the method includes further defining the threshold number of feature points as including a minimum number of feature points.

According to one embodiment of the method, the method includes positively identifying the actor as a discrete set of the feature points identified as moving feature points.

According to one embodiment of the method, the method includes positively identifying the actor as a discrete set of the feature points identified as moving feature points, and defining the threshold number of feature points as a percentage of the discrete set.

According to one embodiment of the method, the method includes tracking the movement of the actor by a feature point tracking method that tracks movement of a plurality of feature points that correspond to the actor.

According to one embodiment of the method, the feature detection method comprises the features from accelerated segment test (FAST) corner detection method.

According to one embodiment of the method, the feature point tracking method comprises the features from accelerated segment test (FAST) corner detection method.

According to one embodiment of the method, the method includes processing the video frames according to an optical flow method.

According to one embodiment of the method, the method includes predicting, by the optical flow method, the position of a lost feature point in a video frame where the feature point tracking method failed to identify the lost feature point.

According to one embodiment of the method, the optical flow method comprises the Kanade-Lucas-Tomasi (KLT) method.

According to one embodiment of the method, the method includes determining an initial position of the trigger area relative to a reference point.

According to one embodiment of the method, the method includes identifying one or more of the feature points as outliers, and ignoring the feature points identified as outliers in the determining the threshold number of feature points.

According to one embodiment of the method, the method includes tracking the position of the trigger area, and determining, based on the tracked position of the trigger area, that the trigger area is displaced from the initial position of the trigger area relative to the reference point.

According to one embodiment of the method, the method includes adjusting the position of the trigger area to reflect the initial position of the trigger area relative to the reference point.

According to one embodiment of the method, the method includes determining the reference point based on an at least one of the feature points identified as a fixed feature point.

BRIEF DESCRIPTION OF THE DRAWINGS

FIG. 1 is a flow-diagram of an exemplary slow-motion video capture process.

FIGS. 2A-2F are schematic diagrams of exemplary digital cameras according to the disclosed features.

DETAILED DESCRIPTION

Figure 2D:
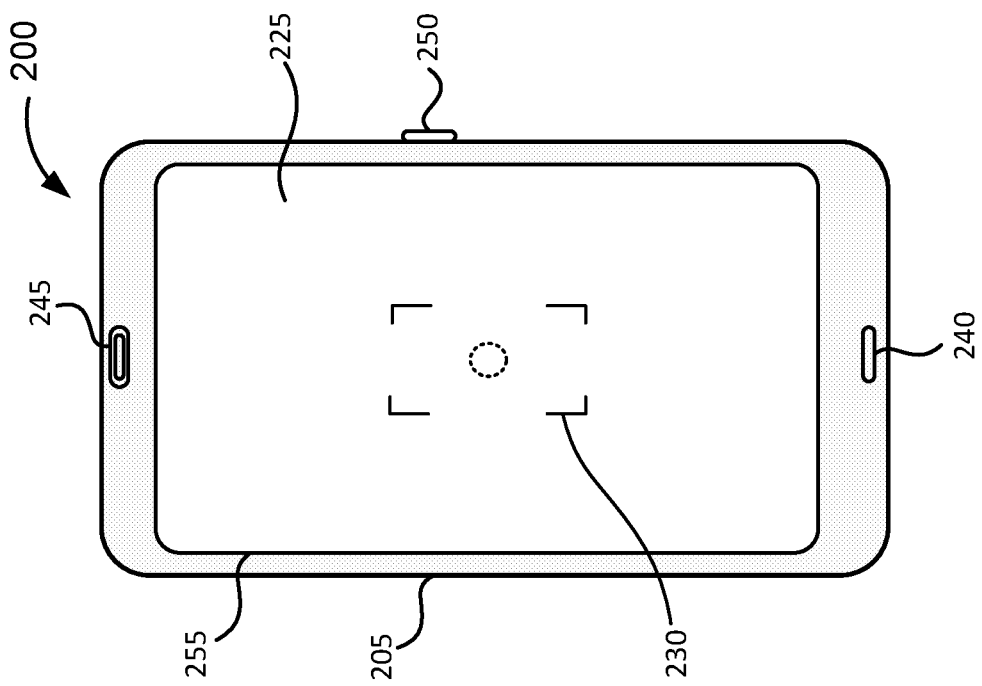

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of systems and methods for triggering slow-motion video capture on a digital camera based on detection and tracking of objects within the field of view of the digital camera. The disclosed techniques are primarily described in the context of standalone digital cameras, digital cameras incorporated into smartphones or other personal electronic devices, or mounted surveillance type digital cameras. However, the techniques may be applied in numerous other contexts where slow-motion video is captured using a digital camera. The disclosure herein is meant to be exemplary, and not limiting.

As used herein, the term "digital camera," or "camera" includes any device configured to record and store video. That is, any device that is configured to record and store a sequence of photographic images (i.e., video "frames," or "image frames"). In one embodiment, the digital camera may be part of a digital camera system that is further configured to process the images such that the images may be displayed in the recorded sequence with sufficient rapidity as to create the illusion of motion and/or continuity. The term viewfinder, as used herein, means a device on a camera showing the field of view of the digital camera, and used in framing and focusing the picture. In many instances, the viewfinder will include a display, which may have touch input functionality.

FIG. 1 is a flow diagram of exemplary steps for initiating slow-motion video capture on a digital camera based on object tracking, in accordance with an embodiment. The steps involve techniques for determining when an actor captured in the video frames has moved into a trigger area, which has been defined by a user of the digital camera. Upon a determination that the actor has moved into the trigger area defined by the user, slow-motion video capture is initiated.

While the techniques described herein are illustrated using a human actor as an exemplary actor, the actor need not be a human person. Other exemplary actors include, but are not limited to an animal, a ball, a motor vehicle, etc.

With reference to FIG. 1, at step 101, a trigger area is defined by a user of the digital camera. In accordance with an embodiment, the user defines the trigger area on a viewfinder of the digital camera. The viewfinder may, at the time the user defines the trigger area, display the scene captured by the camera. Thus, the user may define the trigger area relative to real-world objects displayed in the viewfinder as a result of the objects being in the camera's field of view and being captured by the camera and displayed to the user via the viewfinder.

At step 102 the camera tracks movement of the actor within the field of view of the digital camera. In accordance with an embodiment, tracking the actor's movement can include analyzing image frames captured by the camera using computer vision algorithms, such as feature point tracking methods and optical flow methods. In order to avoid unintended initiation of slow-motion video capture, the camera may also isolate the actor from other moving objects (i.e., non-actor moving objects) within the field of view of the camera, using techniques described herein.

At step 103, the camera determines that the actor has moved into the trigger area defined by the user. In accordance with embodiments, the camera may determine that the actor has moved either fully or partially into the defined trigger area.

At step 104 the camera initiates slow-motion video capture as a result of the determination that the actor has moved into the trigger area.

By initiating slow-motion video capture upon a determination that the actor has moved into the trigger area, the action of the actor—from the point when slow-motion video capture is initiated—is captured for playback in slow-motion without user input required to initiate slow-motion video capture. The process described in FIG. 1 may be referred to herein as "automated slow-motion video capture."

Turning now to FIGS. 2A-2F, depicted are diagrams of an exemplary digital camera that may be configured for triggering slow-motion video capture based on object detection and tracking. Digital camera 200 (also referred to simply as "camera 200") is depicted in different form factors, consistent with embodiments described herein. Each exemplary digital camera depicted in FIGS. 2A-2F includes the ability to capture slow-motion, or extreme slow-motion video. As previously indicated, "slow-motion video" and/or "extreme slow-motion video", is video taken at a higher frame rate per unit time (e.g., 960 FPS) than the frames will be played back to a viewer (e.g., 24 or 30 FPS), thereby creating the illusion that time (within the replayed slow-motion video) is slowed down.

FIGS. 2A and 2B are diagrams of an exemplary standalone consumer-type digital camera, in accordance with an embodiment. FIG. 2A depicts the front side of standalone digital camera 200. As shown in FIG. 2A, exemplary standalone digital camera 200 comprises a housing 205, a shutter control button 210, a flash light 215, and optics 220. Additional sensors, meters, input features, etc., may be present. FIG. 2B depicts the rear, or user-control side, of the exemplary standalone digital camera 200. As shown in FIG. 2B, exemplary standalone digital camera 200 further comprises a viewfinder 225. Viewfinder 225 may also have image centering aids 230 to aid a user in centering an image in the viewfinder.

Figure 2C:
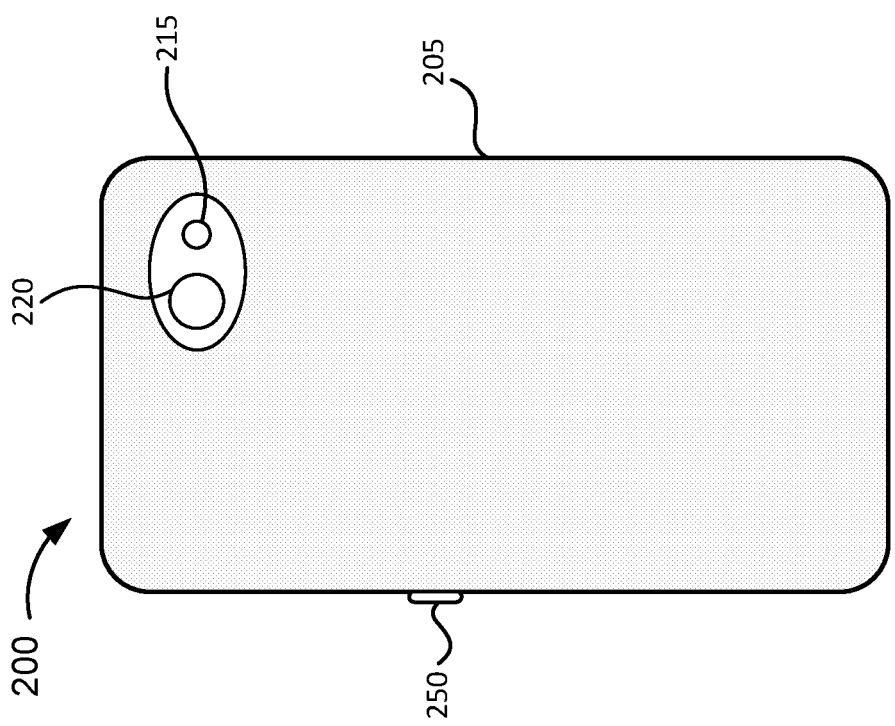

FIGS. 2C and 2D are diagrams of an exemplary digital camera 200 that has been integrated into a personal electronic device, in accordance with an embodiment. The personal electronic device depicted in FIGS. 2C and 2D is a mobile radio telephone embodied as a smartphone. Many personal electronic devices can be equipped with digital cameras, however, and FIGS. 2C and 2D are meant to be exemplary and illustrative, and not meant to be limiting.

FIG. 2C depicts the back side of the personal electronic device including integrated digital camera 200, in accordance with an embodiment. As shown in FIG. 2C, the personal electronic device comprises a housing 205, flash light 215, camera optics 220, and a button 250. Additional sensors, meters, input features, etc., may be present. The front side, or user interface side, of the personal electronic device is shown in FIG. 2D. As depicted in FIG. 2D, the personal electronic device further comprises a microphone 240, a speaker 245, and a screen 255. When digital camera 200 is activated on the personal electronic device, the viewfinder 225 can be displayed on the screen 255 of the personal electronic device. Viewfinder 225 may include centering aids 230 to aid user of camera 200 and centering an image in the viewfinder.

Figure 2F:
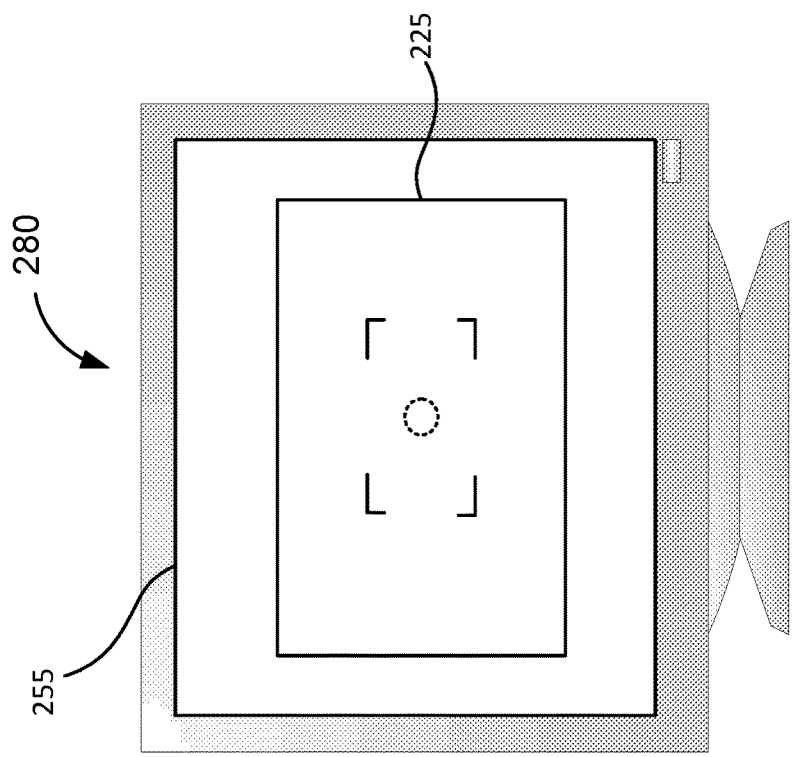
Figure 2E:
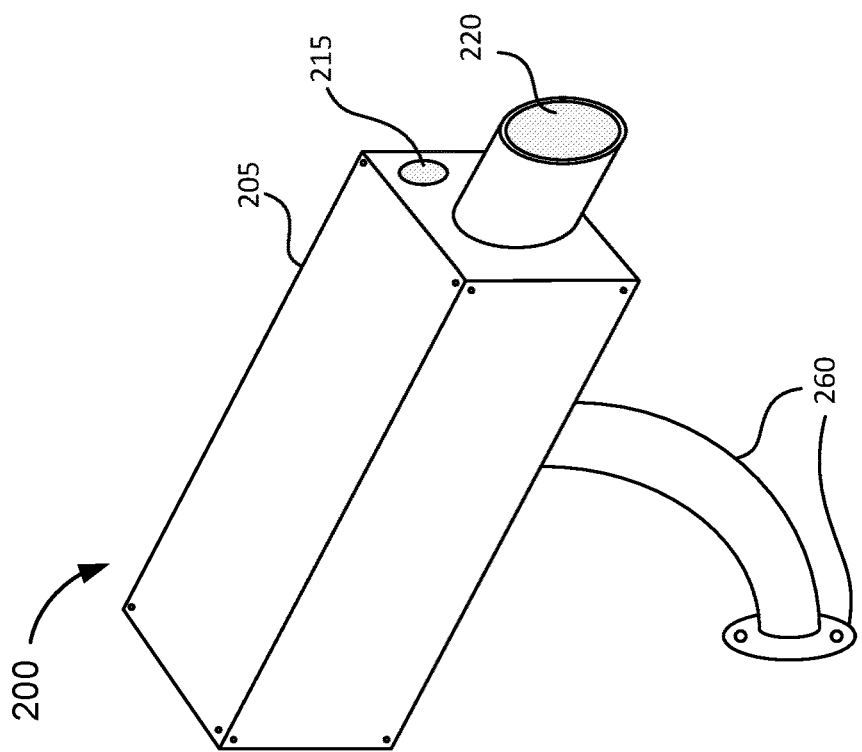

FIG. 2E depicts digital camera 200 as a mounted surveillance-type camera, in accordance with an embodiment. As shown in FIG. 2E, surveillance-type digital camera 200 comprises housing 205, flash light 215, and optics 220. Additionally, as shown in FIG. 2E, surveillance type digital camera 200 may be mounted using mounting post and mounting bracket 260.

Certain embodiments of digital camera 200, such as a mounted surveillance-type camera, as shown in FIG. 2E, may not include a view finder integrated into the housing 205 of camera 200. However, such embodiments may display a viewfinder remotely. For instance, FIG. 2F shows viewfinder 225 of camera 200 displayed on screen 255 of monitor 280. Such an embodiment allows a user to see viewfinder 225 of camera 200 when camera 200 is mounted in areas in which it would be inconvenient for a user to view a viewfinder integrated into camera 200.

In accordance with the embodiment of camera 200 depicted in FIGS. 2E and 2F, the video captured by optics 220 may be transferred to screen 255 and displayed in viewfinder 225 in any suitable manner. For example, video from camera 200 can be displayed via a digital or analog video cable according to any number of video or graphics standards, such as VGA, DVI, S-Video, etc. Alternatively, video data from camera 200 can packetized and transported over a wired or wireless computer network connection.

Figure 3:
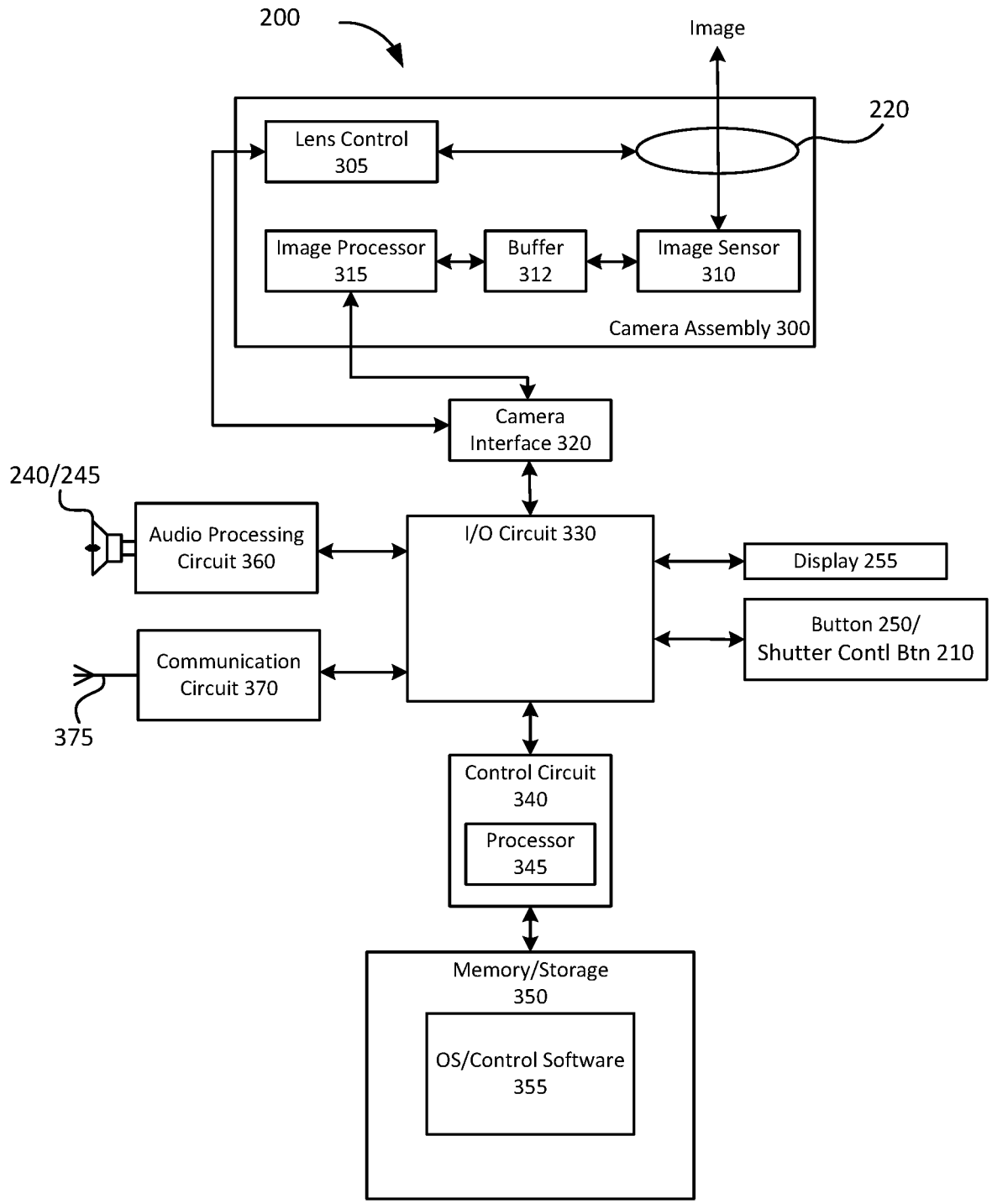
FIG. 3 is a schematic block diagram of an exemplary digital camera according to the disclosed features.

Turning now to FIG. 3, the general operation of exemplary digital camera 200 will be described. FIG. 3 illustrates a block diagram of exemplary digital camera 200 in accordance with an embodiment. Digital camera 200 comprises a camera assembly 300, and camera interface 320. Camera assembly 300 includes camera optics 220 (e.g., one or more lenses other optical elements), image sensor 310, image processor 315, and optics control 305. Camera optics 220 collect and focus light onto image sensor 310 in response to control signals from optics control 305. Optics control 305 may control camera optics 220 by, for example, changing the focus of camera optics 220 in response to an automatic focus function or in response to user input.

Image sensor 310 captures images formed by light collected and focused by camera optics 220. Image sensor 310 may be any conventional image sensor, such as a charge-coupled device (CCD) or a complementary metal oxide semiconductor (CMOS) image sensor. The image processor 315 may be a conventional digital signal processor programmed to process image data. Image processor 315 processes raw image data captured by image sensor 310. Buffer 312 may receive raw image data from image sensor 310 and store the image data until image processor 315 is able to process the image data. Buffer 312 may include a suitable memory for storing the image data received from image sensor 310.

With continued reference to FIG. 3, digital camera 200 includes input/output (I/O) circuit 330 (e.g., a system bus), control circuit 340, a memory/storage 350, and operating system (OS)/Control Software 355. Control circuit 340 is responsible for the overall operation of digital camera 200. Control circuit 340 may be implemented as, or include, hardware (e.g., a microprocessor, microcontroller, central processing unit (CPU), etc.) or a combination of hardware and software (e.g., a system-on-chip (SoC), an application-specific integrated circuit (ASIC), etc.). In one embodiment, control circuit 340 includes a processor 345 that executes operating instructions. The processor 345 of control circuit 340 may execute code in order to carry out the operation of digital camera 200.

Memory/storage 350 includes one or multiple memories and/or one or multiple other types of storage mediums. For example, memory/storage 350 may include a random access memory (RAM), a dynamic random access memory (DRAM), a cache, a read only memory (ROM), a programmable read only memory (PROM), flash memory, and/or some other type of memory. Memory/storage 350 may include a hard disk (e.g., a magnetic disk, an optical disk, a magneto-optic disk, a solid state disk, etc.). In a typical arrangement, memory/storage 350 includes a non-volatile memory for long term data storage and a volatile memory that functions as the system memory for control circuit 340. The memory/storage 350 may exchange data with control circuit 340 over a data bus. Accompanying control lines, and an address bus, between memory/storage 350 and control circuit 340 may also be present. Memory/storage 350 is considered a non-transitory computer readable medium.

OS/control software 355 may include device firmware, an operating system (OS), or a variety of applications that may execute on digital camera 200. By way of example, depending on the implementation of digital camera 200, the operating system may correspond to Linux, Unix, Android, iOS, etc. Additionally software 355 may comprise a camera operation application, and/or a photo editing application.

In embodiments where digital camera is incorporated into a general-use personal electronic device (as shown in FIGS. 2C and 2D), software 355 may comprise any appropriate programs for carrying out functions of the device such as, but not limited to, a telephone application, a multi-media application, an e-mail application, a contacts application, a calendar application, an instant messaging application, a web browsing application, a location-based application (e.g., a Global Positioning System (GPS)-based application), etc.

Input/output circuit 330 interfaces control circuit 340, and memory 350, with image processor 315 of camera assembly 300 via camera interface 320. Via camera interface 320 and I/O circuit 330, image processor 315 can store captured video image frames or still images in memory 350 (either temporarily in the case of system RAM, or persistently in the case of non-volatile storage, such as a hard disk or solid state media). Moreover, image processor 315 can output scenes captured in the field of view of optics 220 to a display 255 as viewfinder 225 (as shown in FIGS. 2B, 2D, and 2F).

In accordance with an embodiment, camera interface 320 may also interface camera assembly 300 with various user interface components for various purposes. For example, and as further illustrated in the embodiments of FIGS. 2A-2F, digital camera 200 may include display 255, button 250 and/or shutter control button 210, microphone 240, and speaker 245. Display 255 may be configured as a touch sensitive display and include soft buttons or controls (not shown) that can be used to adjust the focus of optics 220 via optics control 305. In another embodiment, display 255, configured as a touch sensitive display, may include a soft button (not shown) that operates a shutter (not shown) that exposes light through optics 220 and to image sensor 310.

In other embodiments, shutter control button 210 or button 250, either of which may be a hard button or a soft button, can operate a shutter (not shown) that exposes light through optics 220 and to image sensor 310. Further, button 210 may be configured to, e.g., adjust the focus of optics 220 via optics control 305.

In accordance with an embodiment, microphone 240 may be used to record audio content corresponding to recorded video image frames, and speaker 245 may be used to play back audio content corresponding to captured video. Microphone 240 and speaker 245 may interface with control circuit 340 and memory/storage 350 through audio processing circuit 360, and I/O circuit 330.

In accordance with an embodiment, digital camera 200 may include communication circuit 370. Communication circuit 370 may include one or multiple wireless interfaces and/or wired interfaces (not shown). Communication circuit 370 may further include one or multiple transmitters, receivers, and/or transceivers coupled to, e.g., antenna 375, for communication with other electronic devices. Communication circuit 370 operates according to one or multiple protocols, communication standards, and/or the like (i.e., Ethernet, TCP/IP, Wi-Fi, USB, Bluetooth, cellular, etc.). Communication circuit 370 may be used to transmit captured video, photographs, or other data, to or from digital camera 200.

According to other embodiments, digital camera 200 may include fewer components, additional components, different components, and/or a different arrangement of components than those illustrated in FIG. 3 and described herein.

In accordance with an embodiment, a digital camera according to the disclosed features, such as digital camera 200, includes hardware and/or software configured to allow the digital camera to capture slow-motion, or extreme slow-motion, video. Additionally, the camera includes hardware and/or software configured to allow a user of the digital camera to initiate automated slow-motion video capture, as outlined in FIG. 1. As noted above, the automated slow-motion video capture process may begin with user input in the form of defining a trigger area.

In accordance with an embodiment, the camera may rely on user input that configures the camera in a slow-motion video capture mode. Once in the slow-motion camera mode, user input defining a trigger area may be received. Such user input defining the trigger area may be the initial step in the automated slow-motion video capture process. For instance, in one embodiment, to start the automated slow-motion video capture process, the user may manually launch a slow-motion video capture mode on the camera, wherein the camera waits for user input defining a trigger area (e.g., as in step 101 of FIG. 1).

In other embodiments, the camera may remain ready to receive user input defining a trigger area while the camera is operational (e.g., turned on), or while the camera is in a video capture mode (as opposed to, e.g., a still image capture mode). Once a trigger area has been defined and positioned, the remaining steps including tracking the actor, determining that the actor has moved into the trigger area, and initiating slow-motion video, may be carried out.

Figure 4:
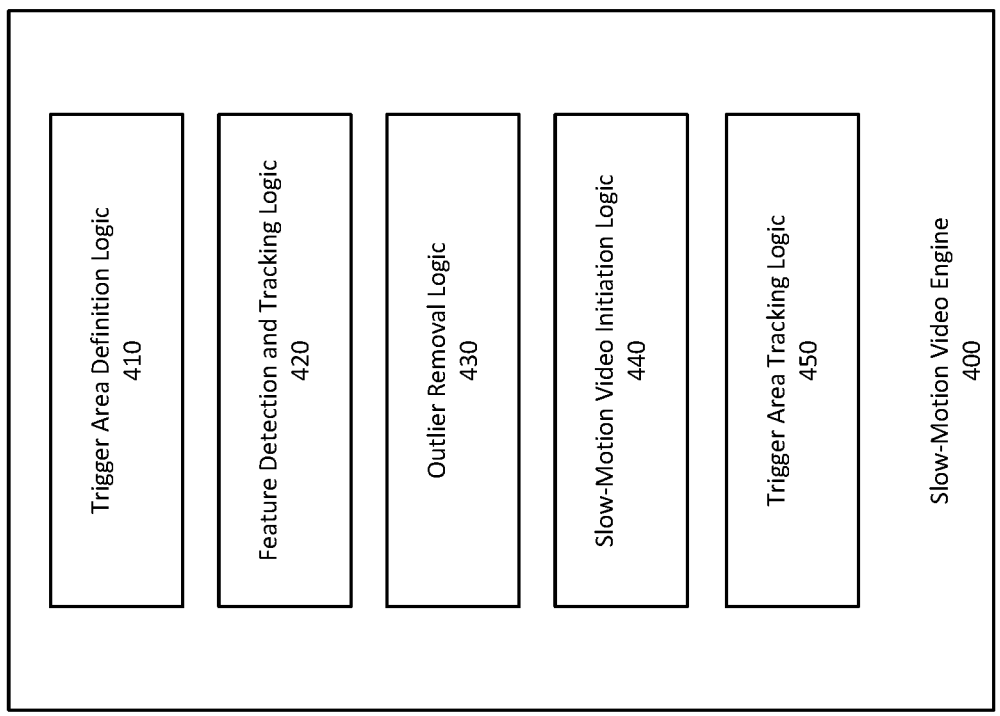
FIG. 4 is a schematic block diagram of an exemplary slow-motion video engine.

With reference to FIG. 4, depicted is a diagram illustrating a slow-motion video engine, in accordance with an embodiment. Slow-motion video engine 400 may be configured to automate the capture of slow-motion video from a digital camera (e.g., digital camera 200), in accordance with embodiments described herein. Slow-motion video engine 400 may be implemented as software and may be included, e.g., in control software 355. In such embodiments, control circuit 340 and/or processor 345 may execute slow-motion video engine 400. Alternatively, slow-motion video engine 400 may be implemented as hardware, or a combination of hardware and software, such as a SoC or an ASIC. In certain embodiments, slow-motion video engine 400 may be a part of, or may be executed by image processor 315. In accordance with an embodiment, slow-motion video engine 400 may include, in any combination, one or more of: trigger area definition logic 410; feature detection and tracking logic 420; outlier removal logic 430; slow-motion video initiation logic 440; and trigger area tracking logic 450.

In an exemplary embodiment, upon activation of slow-motion video engine 400, the digital camera may enter a slow-motion video capture mode. In one embodiment, slow-motion video engine 400 may be activated as a result of user input. For example, in embodiments where digital camera 200 is incorporated into a personal electronic device, such as depicted in FIGS. 2C and 2D, a user may interact with touch sensitive screen 255 to select and launch slow-motion video engine 400 as an application, or "app." In the absence of a touch sensitive screen, a user may use another type of input device, such as a mouse or a keyboard, in order to activate slow-motion video engine 400. In another embodiment, slow-motion video engine 400 may activate at startup of the digital camera's OS, and may run in the background as a service or daemon of the operating system of the digital camera. In still another embodiment, slow-motion video capture mode may become active in one of, or as one of, several selectable modes of the camera.

Once activated, slow-motion video engine 400 may be configured to accept user input for defining a trigger area according to trigger area definition logic 410, thereby initiating the automated slow-motion video capture process.

In accordance with embodiments described herein, when a user of a digital camera according to the disclosed features (e.g., digital camera 200) desires to capture slow-motion video of an actor, the user may position the digital camera to adjust the field of view of the camera to capture the scene in which action by the actor is predicted by the user. For example, the user may use viewfinder 225 to adjust digital camera 200 so that the desired scene is framed in viewfinder 225. As discussed above, viewfinder 225 displays input received through optics 220 to the user of digital camera 200. Thus, a user of camera 200 can visualize the field of view of camera 200, and can frame, within viewfinder 225, the scene in which action by the actor is predicted by the user.

Once the user has framed, in the viewfinder, the scene in which action by the actor is predicted, the user may define a trigger area. The trigger area may be defined and positioned on the viewfinder by the user. The user may position the trigger area on the viewfinder such that the trigger area is superimposed over a part of the scene where the user wishes to initiate slow-motion video capture as a result of the actor moving into the trigger area.

Figure 6:
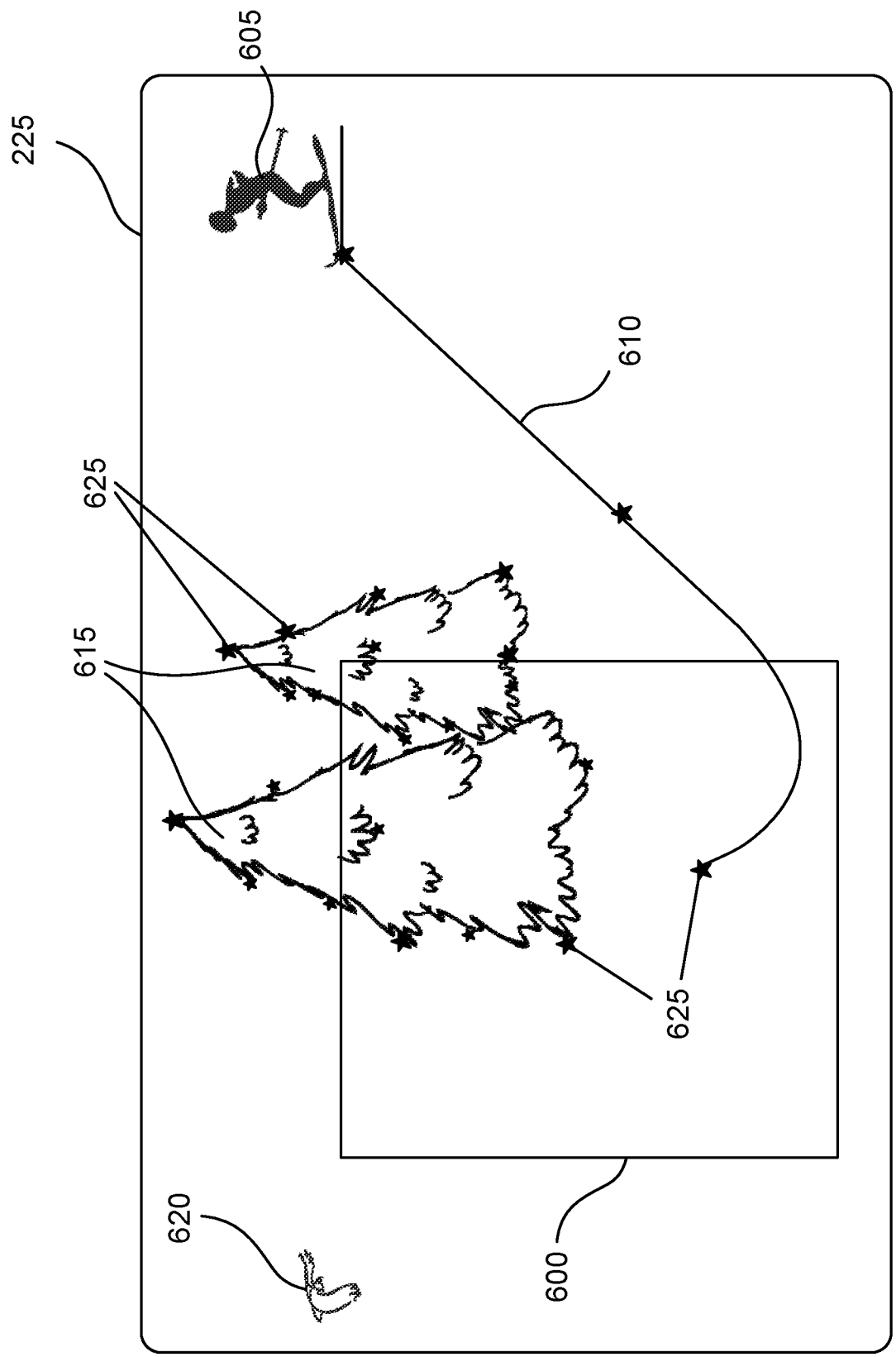
FIG. 6 depicts an exemplary field of view of a digital camera according to the disclosed features as displayed through a viewfinder of the digital camera.

For example, and with reference to FIG. 6, a user may define trigger area 600 on viewfinder 225. As depicted in FIG. 6, viewfinder 225 is showing the field of view of digital camera 200. Framed in viewfinder 225 is a scene of an actor (actor 605, a skier on top of a ski jump 610), along with items that are stationary in the scene (by example, the left and right background trees 615). Items that move in the scene, but are not actors (e.g., bird 620) may also be present. Trigger area 600 is displayed in the viewfinder 225 as superimposed over the scene captured by digital camera 200 and displayed in viewfinder 225.

In accordance with an embodiment, a user may indicate a shape and a position of the trigger area. For instance, trigger area 600 in FIG. 6 is defined as a quadrilateral (specifically, a square), and is positioned off-center in the viewfinder 225. Trigger area 600, however, can be any shape and can occupy any position on view finder 225. In the case where viewfinder 225 is displayed on a touch sensitive screen, a user may draw trigger area 600 directly on viewfinder 225 with a user input tool such as a stylus, or the user's own finger. Additionally, a user may then resize and/or drag trigger area 600, through touch gestures, to the desired location on the viewfinder, such that trigger area 600 covers an area of camera's 200 field of view where slow-motion video capture is desired. The covered area may correspond to an area of the scene in which action by the actor 605 is predicted by the user to occur, and the user desires to capture slow-motion video for the action. As an example, in the depiction of FIG. 6, trigger area 600 is positioned to initiate slow-motion video capture as the actor enters the lift-off area of ski jump 610.

In other embodiments (e.g., embodiments where viewfinder 225 is not displayed on a touch sensitive screen), the user may draw and locate trigger area 600 using input devices such as a mouse or a keyboard. Alternatively, a user may pick from an assortment of predefined shapes and sizes of trigger area 600 using traditional or common user interface components (such as selection boxes, drop-down boxes, list boxes, etc.) and inputs (such as, e.g., a mouse, a keyboard, and/or a combination of hard and soft buttons). After a selection of a predefined shape and size of trigger area 600 has been made by the user, trigger area definition logic 410 may display an outline of the trigger area 600 on viewfinder 225. A user of digital camera 200 may then manipulate the size and/or position of trigger area 600 with further use of the user interfaces and inputs as described above. In accordance with an embodiment, predefined shapes and sizes of trigger area 600 can be stored in memory/storage 350 of digital camera 200. In one embodiment, the trigger area covers less than the entire viewfinder (e.g., no more than fifty percent of the viewfinder).

Figure 5:
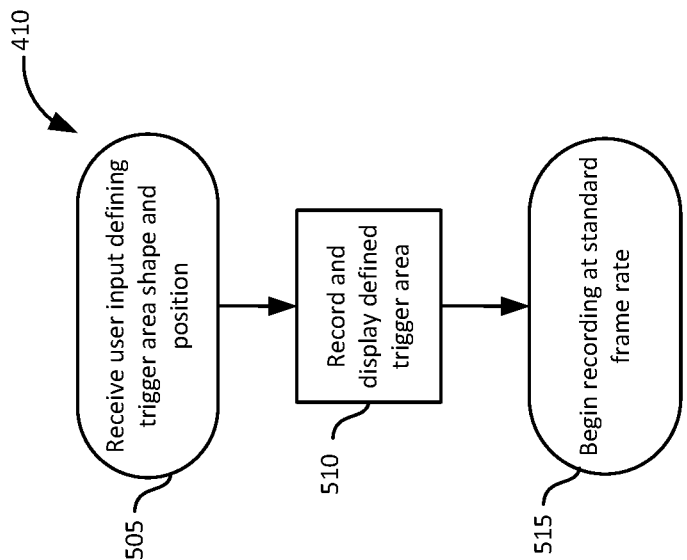
FIG. 5 is a flow-diagram of exemplary trigger area definition logic.

FIG. 5 shows a flow diagram showing exemplary steps of trigger area definition logic 410, in accordance with an embodiment. Trigger area definition logic 410 may start at step 505 by receiving user input that defines a trigger area. Once trigger area definition logic 410 has received user input defining a trigger area at step 505, logical flow advances to step 510.

At step 510, digital camera 200 records the attributes of the trigger area as defined by the user, and displays the defined trigger area shape at the corresponding position on the viewfinder. Attributes such as the shape, size, and position of the trigger area (collectively, defining boundaries of trigger area) may be stored in the memory of the camera and displayed as superimposed on the viewfinder.

At step 515, digital camera 200 begins recording video at a standard frame rate, in accordance with an embodiment. A "standard frame rate," means a frame rate at which video is recorded for playback at the same frame rate, so displayed action takes place at the same rate as at the time of its capture, also referred to as "normal-time" video capture. Step 515 may be automated to begin immediately after the trigger area is defined. Alternatively, step 515 may include sub-steps (not shown) including receiving user input which indicates the user's desire to begin recording standard frame rate video, and initiating standard frame rate capture in response to such user input. The captured frames may be persisted in memory (e.g., memory/storage 350) of digital camera 200 as part of a media file. Additionally, audio corresponding to the captured video may be captured and stored along with the captured video in the media file. The media file may be of any suitable standardized or proprietary format and may be compressed using any suitable codec or compression algorithm.

In another embodiment, frames captured at step 515 may not be persisted to the memory of camera 200 until the camera receives user input indicating that such persistence should begin. In such an embodiment, frames captured before such user input is received may be processed, e.g., by image processor 315, and/or according to slow-motion video engine 400, and then deleted or overwritten by subsequent incoming frames. For example, image processor 315 may process each captured frame according to feature detection and tracking logic 420 and/or trigger area tracking logic 450 (both discussed in more detail, below) before deleting or overwriting the processed frame.

Trigger area definition logic 410 may terminate at step 515 with camera 200 recording, or ready to record, incoming video image frames as normal-time video (i.e., at a standard frame rate).

Referring back to FIG. 1, after a trigger area has been defined in step 101, the movement of the actor is tracked within the field of view of the camera at step 102. In order to track the movement of the actor within the field of view of the camera, the camera may begin by identifying features points in the video frames captured by the camera, in accordance with an embodiment. To identify feature points, the video frames captured by the digital camera may be analyzed according to feature detection methods in order to identify features within the frames. Generally, feature detection methods start by examining every pixel in a captured image. Each pixel is examined with respect to its surrounding pixels to determine if there is a feature present at or near the pixel being inspected. Image features can take the form of, e.g., isolated points, continuous curves, or connected regions, within the image.

Feature detection methods are generally classified by the type of image features that they identify. Some examples of categories of feature detection methods include edge detection, corner detection, blob detection, and ridge detection methods. Feature detection methods define identified features as a set of feature points in the image, where one or more feature points reflect an instance of the identified feature. Accordingly, features points identified by an edge detection algorithm will generally represent all or a portion of the edge of a feature. Likewise, features detected by a corner detection method will represent the point where two edges of a feature come together to make a corner. Certain feature detection methods may combine two or more feature classifications in order to make the algorithm more robust (e.g., some feature detection methods combine corner and blob detection methods).

Figure 8:
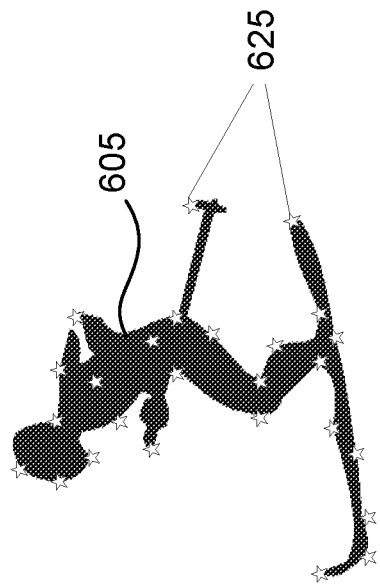
FIG. 8 is a schematic diagram of an exemplary actor including exemplary feature points.
Figure 9:
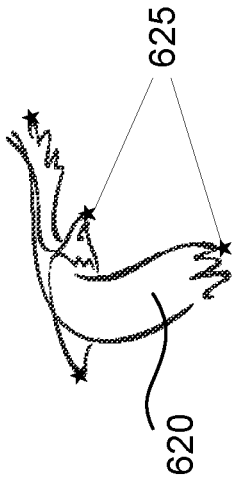
FIG. 9 is a schematic diagram of an exemplary non-actor moving object including exemplary feature points.

FIG. 6 shows exemplary feature points 625 that a feature detection method may identify with regard to relatively stationary objects, such as left and right trees 615, and ski jump 610, when processing a digital image of the scene in viewfinder 225. Each feature point is represented by a star. With additional reference to FIGS. 8 and 9, shown are detailed depictions from FIG. 6 of actor 605 and bird 620 (which represents a non-actor moving object in the scene), respectively. As shown in FIG. 8 a feature detection method may identify feature points 625 (each depicted as a star) with regard to actor 605 when processing a digital image of the scene in viewfinder 225. Likewise, a feature detection method may identify feature points 625 with respect to bird 620, as illustrated in FIG. 9.

The feature points 625 are illustrated to represent exemplary feature points that a feature detection method may identify when processing a digital image of the scene in viewfinder 225 of FIG. 6. The feature points 625 are not meant as a limit of the number of feature points that may be detected by a feature detection method, or to represent an exact number or location of feature points that a feature detection method may detect. In practice, suitable feature detection methods may identify more, less or different feature points than those depicted in the accompanying figures. Also, a visual identifier of the feature points (for example, the representative stars) need not be displayed on the viewfinder.

In accordance with an embodiment, once a frame has been processed according to a feature detection method, and feature points have been identified, the movement of the feature points may be tracked using a feature point based tracking method. In a feature point based tracking method the movement of feature points is tracked relative to the feature points' respective positions as detected in previously captured frames. That is, a feature point identified as representing a feature in one image can be matched with a feature point that represents the same feature in a successive image, and the differential in the position of the corresponding feature points (i.e., the feature points representing the same feature) can be recorded. In this way, the movement of the feature points can be tracked, in accordance with an embodiment.

Occasionally, feature point based tracking may fail in that a feature point that was identified in a previously captured frame is not identified in a subsequently captured frame (a "lost feature point"). In order to re-find lost feature points, frames may be processed with certain optical flow algorithms which can predict the position of the lost feature point based on the lost feature point's position as identified in previously captured frames, and/or the tracked position of other feature points. In accordance with an embodiment, optical flow methods may be used in conjunction with feature point based tracking to re-find lost feature points.

In other embodiments, other motion analysis techniques may be used to track an actor's motion (e.g., actor 605), such as the background subtraction method, contour based object tracking, region based object tracking, etc.

Figure 7:
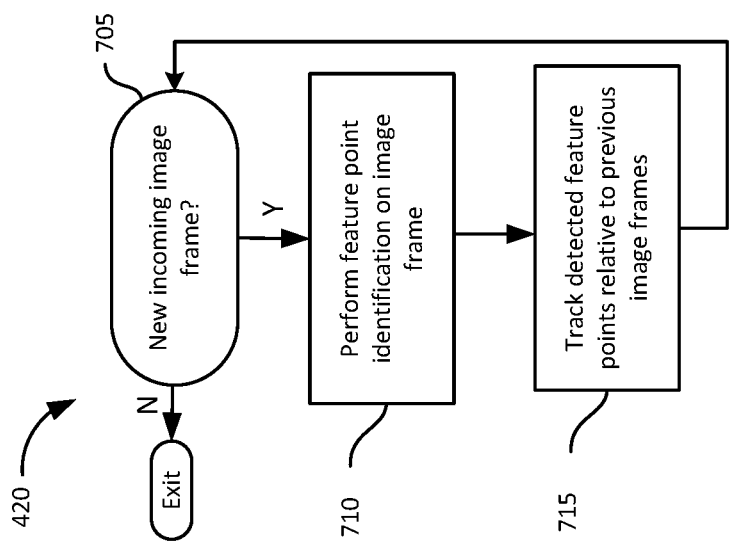
FIG. 7 is a flow-diagram of exemplary feature detection and tracking logic.

FIG. 7 is a flow diagram of exemplary feature detection and tracking logic 420, in accordance with an embodiment. Feature detection and tracking logic may be used by an exemplary digital camera according to the disclosed features (e.g., camera 200) to identify and track feature points in video frames.

At step 705, feature detection and tracking logic 420 determines whether there is a new incoming image frame. In the case of a negative determination (e.g., where a user has discontinued the capture of new incoming frames by, for instance, exiting the camera application of a smart phone), feature detection and tracking logic 420 may terminate. In the case of a positive determination, however, logical flow advances to step 710.

In step 710 feature detection and tracking logic 420 performs feature point identification on the incoming image frame. Feature point identification may be initiated by processing a captured frame according to any suitable feature detection method. Some exemplary feature detection methods include the Canny edge detector, the Sobel operator or filter, the smallest univalue segment assimilating nucleus (SUSAN) corner detector, the difference of Gaussians (DoG) algorithm, the Scale-invariant feature transform (SIFT) algorithm, the features from accelerated segment test (FAST) corner detection method, etc.

After feature point detection has been performed on the incoming image frame, logical flow may advance to step 715. At step 715, feature point tracking is performed on the incoming frame, in accordance with an embodiment. Some of the feature detection methods listed above are also feature tracking methods (e.g., FAST) and may be suitable for utilization in step 715. As noted above, certain optical flow methods for predicting the position of lost feature points, including the Lucas-Kanade method or the Kanade-Lucas-Tomasi (KLT) method may also be used to analyze the frame at step 715, in accordance with an embodiment.

In accordance with an embodiment, and as depicted in FIG. 7, feature point detection and feature point tracking are performed on successive video frames captured by the digital camera. Feature detection and tracking logic may be configured as a logical loop, where each video frame captured by the camera is analyzed to both detect feature points and track feature points, according to methods described above.

Figure 10:
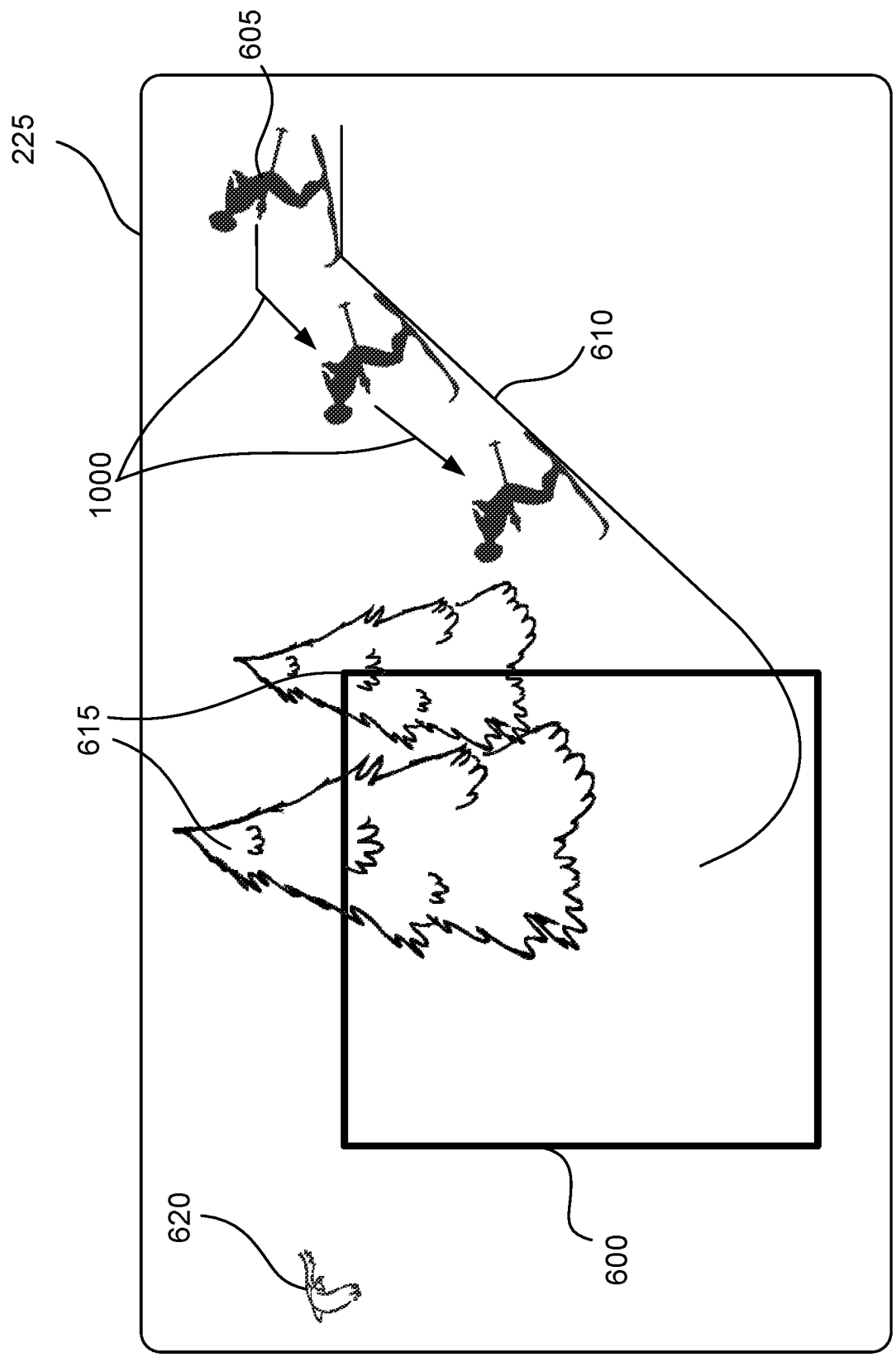
FIG. 10 depicts an exemplary field of view of a digital camera according to the disclosed features as displayed through a viewfinder of the digital camera, including movement, over time, of an exemplary actor.

FIG. 10 illustrates movement of exemplary actor 605 in the field of view of camera 200 and displayed by viewfinder 225 over time. As shown in FIG. 10, actor 605 has begun to move down the slope of ski jump 610. Arrows 1000 represent movement of actor 605 (also referred to as "movement 1000") as time passes. It will be appreciated that multiple instances of an object are not displayed at the same time. Further, arrows representing motion are not displayed, but are included in the figure for purposes of clarity.

In accordance with an embodiment, as movement 1000 takes place, new image frames are being captured and processed according to, e.g., feature detection and tracking logic 420, as discussed above. That is, movement 1000 of actor 605 is progressively captured in successive frames that correspond, in time, to the movement 1000 of actor 605. In accordance with an embodiment, as each image frame is captured, it may be sequentially processed to identify feature points and track movement of identified feature points. Thus, for each image capturing movement 1000 of actor 605, feature points are detected (e.g., feature points 625, not shown in FIG. 10), and the position of the feature points identified in each frame are tracked relative to their position in previous frames. The identity of each such feature point, and its respective position may be recorded, e.g., in variables, for later reference in the automated slow-motion video process.

In accordance with an embodiment, feature points that meet predefined criteria may be identified by the digital camera as moving feature points. As used herein, the term "moving feature points" means feature points determined by the digital camera to have moved more than a threshold distance over a predetermined number of frames. Conversely, the term "fixed feature point," as used herein, means a feature point determined by the digital camera to have moved less than a threshold distance over a predetermined number of frames.

As feature points are identified and tracked, the feature points and their relative position can be recorded (as discussed, above). The digital camera may use the recorded position of the feature points to determine which feature points are moving (e.g., using the difference in position of identified feature points in successive frames). Feature points determined by the camera to have moved more than the threshold distance over a predetermined number of frames may be marked or flagged, e.g., with a Boolean property, as an indication that the feature points are moving feature points or whether they are fixed feature points.

The digital camera may use information about the identified feature points that it has determined and recorded in order to determine if the actor has moved into the trigger area of the digital camera. For example, each frame may be analyzed according to a slow-motion video initiation logic to determine if the actor has entered the defined trigger area, in accordance with an embodiment.

Figure 11:
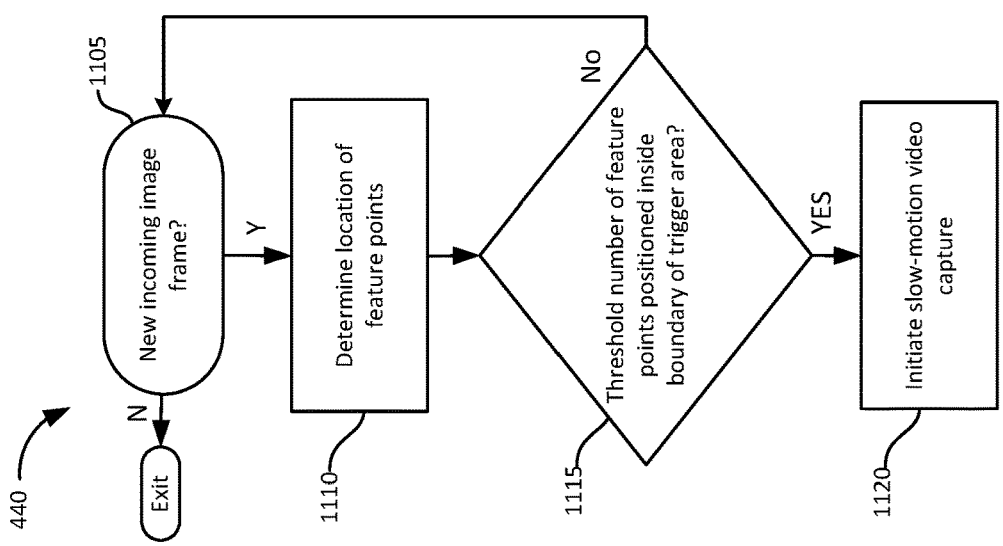
FIG. 11 is a flow-diagram of exemplary outlier removal logic.

FIG. 11 is a flow diagram of exemplary steps of slow-motion video initiation logic 440, in accordance with an embodiment. At step 1105 a determination is made as to whether a new video image frame is incoming. If a negative determination is made, the logic can terminate. If a positive determination is made, however, logical flow may advance to step 1110. At step 1110 the location of identified feature points (as tracked by, e.g., feature detection and tracking logic 420) may be determined. In one embodiment, step 1110 may include retrieving the location of all, or some, of the identified feature points from the memory of the digital camera (e.g., as recorded by feature detection and tracking logic 420). In certain embodiments, only the location of moving feature points may be retrieved. In other embodiments, the location of moving and fixed feature points may be retrieved.

At step 1115, slow-motion video initiation logic 440 determines if a threshold number of feature points are positioned inside the boundary of the trigger area. As used herein, the term "threshold number of feature points" means the number of feature points that that must be positioned inside the trigger area in order to initiate slow-motion video capture. The threshold number of feature points may be defined in any of several suitable ways.

For instance, in one embodiment, the threshold number of feature points may be defined as a percentage of all feature points identified as moving feature points. In another embodiment, the threshold number of feature points may be defined as a percentage of all feature points (whether determined to be moving or fixed). In still another embodiment, the threshold number of feature points may be defined as a simple minimum number of feature points whose position is determined to be inside the boundaries of the trigger area. In still another embodiment, the camera may positively identify the actor as a discrete set of moving feature points, and the threshold number of feature points may be defined as a percentage of the feature points included in the discrete set, or a minimum number of the feature points included in the discrete set.

As will be appreciated, the method used to define the threshold number of feature points will render the position of some, or all, of the identified feature points relevant in initiating slow-motion video capture. In accordance with an embodiment, the position of such relevant feature points may be determined relative to the boundaries of the trigger area displayed on the viewfinder of the camera. Referring again to FIG. 11, if a negative determination is made at step 1115, slow-motion video initiation logic 440 can return to step 1105. However, if a positive determination is made at step 1115, slow-motion video capture can be initiated at step 1120.

Figure 12:
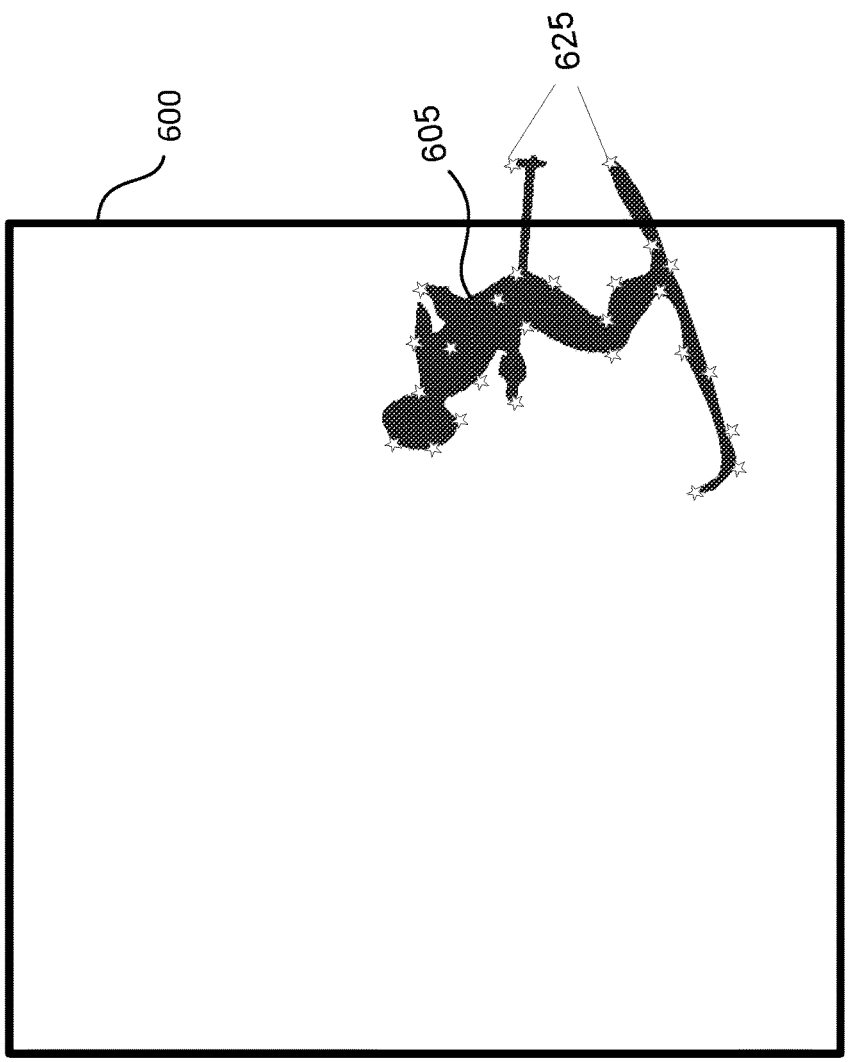
FIG. 12 is a schematic diagram of an exemplary actor, exemplary feature points, and an exemplary trigger area.

By way of example, and with further reference to FIG. 12, depicted is a detailed illustration of trigger area 600, and actor 605 as captured in a video frame and as displayed by viewfinder 225, according to an exemplary embodiment. Also depicted are feature points 625, which have been identified by an exemplary feature detection method as a result of the actor's 605 presence in the image frame, and which have been tracked by an exemplary feature point tracking method. FIG. 12 is a detailed continuation of FIG. 10. Continuing from the motion illustrated in FIG. 10, the actor's motion, over time, has positioned the actor close to the lift-off area of the ski jump 610 (not shown). Moreover, the actor's motion has positioned the actor (as displayed in the viewfinder of the camera) partially inside the boundaries of the trigger area. It will be appreciated that feature points 625 may not be shown in the viewfinder of the camera, but are included in the figure for purposes of illustration and clarity.

As shown in FIG. 12, a majority of the feature points corresponding to actor 605 have moved into the boundaries of the trigger area 600. In such an exemplary embodiment as that shown in FIG. 12, slow-motion initiation logic 440 may determine that the threshold number of feature points required to initiate slow-motion video is positioned inside the trigger area 600, and may initiate slow-motion video capture. As a result, the actor's movement on the lift-off area of the ski jump, and in the air after lift-off, may be captured in slow-motion video.

In accordance with embodiments, it may be beneficial to define the threshold number of feature points as both a percentage of the feature points identified as moving feature points and as a minimum number of feature points (a "minimum threshold"). That is, in order to initiate slow-motion video capture the digital camera must determine not only that a percentage of the identified moving feature points are positioned in the trigger area, but also that the number of moving feature points is greater than the defined minimum threshold number.

A minimum threshold in conjunction with a percentage of moving feature points, as described above, may be used in order to minimize instances of non-actor moving objects (e.g., bird 620) initiating slow-motion video capture. Since actors are more likely to be in the foreground of the captured scene, they are more likely to be captured with more detail in the image. The actor being captured with better detail will result in the camera being able to detect more features of the actor and, therefore, assign more feature points with respect to the actor's detected features. Conversely, background objects will be captured with less detail and, therefore, less resulting feature points. Moreover, larger sized actors (such as actor 605, a vehicle, etc.,) will produce more feature points than smaller objects which may move within a scene (such as bird 620). Consequently, actors are likely to have more feature points than non-actors (i.e., background objects, non-actor moving objects, etc.). Therefore, actors are more likely to meet the minimum threshold requirement for initiating slow-motion video capture. In one embodiment, the minimum threshold may be user-adjustable so that the user can fine-tune the minimum threshold to different scenes.

By way of example, the threshold number of feature points required to initiate slow-motion video may be defined as, e.g., fifty percent of all moving feature points identified in the frame. In a frame where the actor has not entered the scene, but a non-actor moving object (e.g., bird 620) is present in the frame, there may only be, e.g., four moving feature points identified in the frame (which correspond to e.g., bird 620). In such a scenario slow-motion video capture would be initiated when as few as two of the feature points corresponding to bird 620 were determined to be positioned within the boundaries of the trigger area. Consequently, if all, or even parts, of bird 620 moved into the trigger area, slow-motion video capture would be initiated by a non-actor moving object.

Given the same scenario as above (where the threshold number of feature points is defined as 50 percent of all moving feature points), but where a minimum threshold number of, e.g., 20 feature points is also factored into slow-motion video initiation logic, bird 620 would not initiate slow-motion video logic by moving into the trigger area. This is because bird 620 does not have enough corresponding feature points to satisfy the minimum threshold of 20 feature points.

Figure 13:
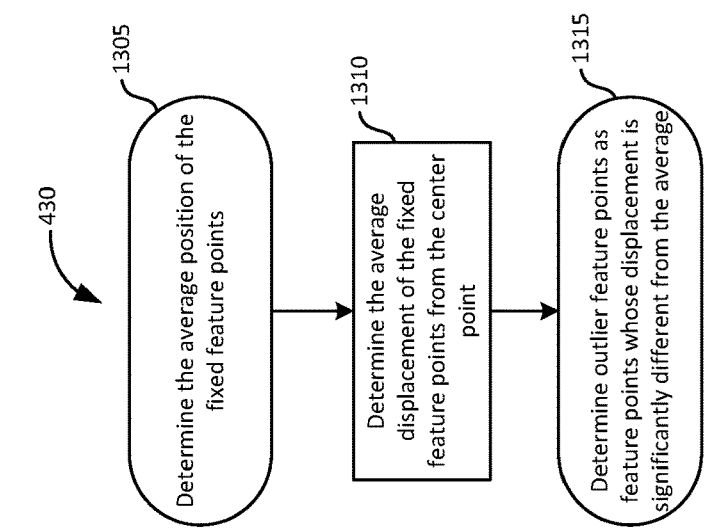
FIG. 13 is a flow-diagram of exemplary outlier removal logic.

In order to further minimizing instances of non-actor moving objects initiating slow-motion video capture, statistical algorithms (in addition to a minimum threshold, as discussed above) may be used to identify outlier feature points, in accordance with an embodiment. Feature points that fit a statistical profile may be identified as outlier feature points, and may be ignored, e.g., by slow-motion video initiation logic, in determining if the threshold number of feature points is positioned inside the trigger area. FIG. 13 shows exemplary steps that may be performed by an outlier removal logic (e.g., outlier removal logic 430) to identify outlier feature points, in accordance with an embodiment.

With reference to FIG. 13, shown is a flow diagram detailing exemplary steps of outlier removal logic 430, in accordance with an embodiment. At step 1305, the average position (i.e., the geometric center) of all of the feature points identified as fixed feature points in a frame is determined. At step 1310, the average displacement of the detected feature points from the center point is determined. At step 1320, outlier feature points are determined as those feature points whose displacement from the center is significantly different from the average displacement. In an exemplary embodiment, a feature point whose displacement from the center point may be considered significantly different from the other identified feature points is, for example, one whose displacement is greater than three times the median displacement of the fixed feature points.

In order for embodiments to be more robust when initiating slow-motion video capture, trigger area tracking, and trigger area position updating, may be performed, in accordance with an embodiment. Trigger area tracking and position updating is desirable to maintain the relative position of the defined trigger area in the event of mild or moderate camera displacement (i.e., camera movement or shake) during video recording that results from, e.g., a user attempting to hold the camera while capturing video. Mild camera displacement may even occur while the camera is mounted on a tripod or other mount due to wind, vibrations, etc.

Movement of the trigger area may be tracked relative to a fixed feature, and the position of the trigger area may be updated relative to the fixed feature in order to maintain the trigger area's position with respect to the fixed feature. By compensating for camera shake in this manner, the position of the trigger area can remain anchored to stationary objects in the scene (e.g., ski jump 610), and thereby allow the actor to enter the trigger area and, in turn, initiate slow-motion video capture, at the location desired by the user.

Figure 14:
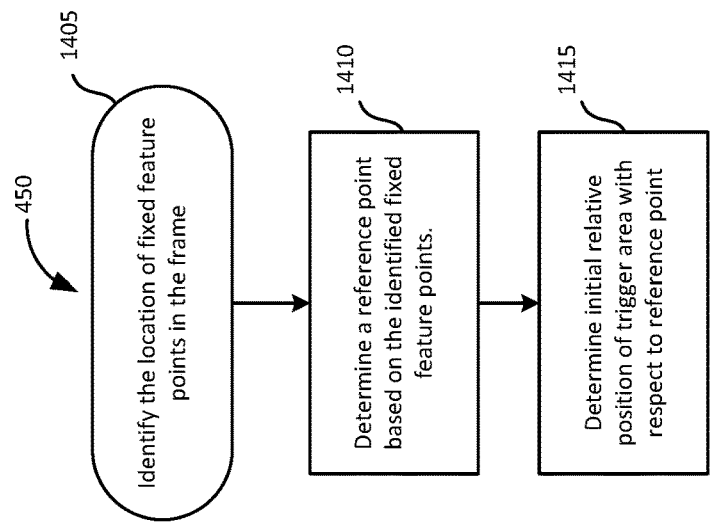

FIG. 14 shows an exemplary flow diagram of steps that may be performed by trigger area tracking logic 450 in order to determine a position of the trigger area with respect to a reference point. The reference point is determined based on feature points that have been identified as feature points that are fixed relative to the scene being imaged. As used herein, the term "fixed feature point(s)" means a feature point that is determined to have moved less than a threshold distance over a predetermined number of frames (previously noted, above).

Trigger area tracking logic 450 may begin at step 1405 with the identification of fixed feature points. Trigger area tracking logic 450 may use records of feature points and their respective locations (as discussed above) in identifying fixed feature points. In accordance with an embodiment, outlier feature points (as detected by, e.g., outlier removal logic 430), may be ignored when identifying fixed feature points. In a scenario where many, or most, of the same features remain in the field of view of digital camera 200 throughout the capture of video frames, the result of identifying fixed feature points is a set of feature points that are stationary, or near stationary, in the scene captured by camera 200.

After fixed feature points are identified in step 1405, logical flow may advance to step 1410. At step 1410, a reference point is determined based on the identified fixed feature points, in accordance with an embodiment. The reference point may be a single point, or it may be a plurality of points. For example, in one embodiment the reference point may be one or more of the identified fixed feature points. In another embodiment the reference point may be the average position (i.e., the geometric center) of one or more of the fixed feature points. Any suitable method for deriving a reference point based on the one or more identified fixed feature points may be employed.

Once a reference point is determined, control may pass to step 1415. In step 1415, the initial position of the trigger area relative to the reference point is determined (referred to herein, and in the accompanying drawings as the "initial relative position"), in accordance with an embodiment. The initial relative position may take the form of, e.g., a set of coordinates (for instance (x, y) coordinates), or any suitable form for identifying the initial relative position of the trigger area with respect to the reference point. The initial relative position can be stored for later reference by trigger area tracking logic 450.

Figure 15:
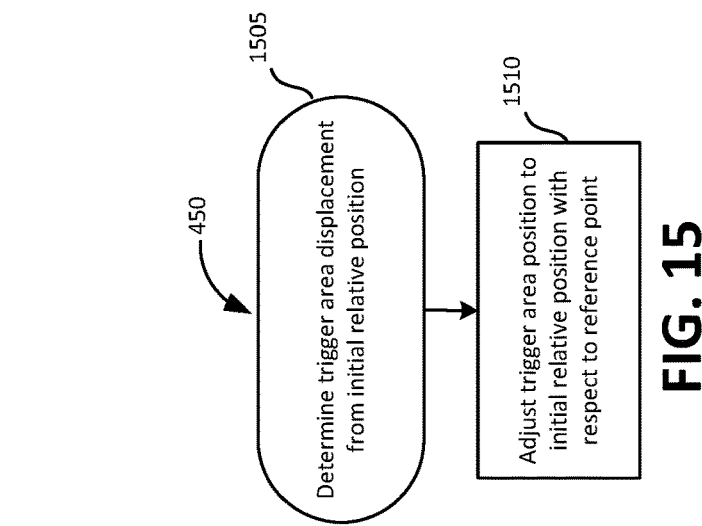
FIGS. 14 and 15 are flow-diagrams of exemplary trigger area tracking logic.

Referring to FIG. 15, shown is a flow diagram of steps trigger area tracking logic 450 may take once a reference point and an initial relative position of the trigger area has been determined, in accordance with an embodiment. At step 1505, it can be determined if the trigger area has been displaced from the initial relative position with respect to the reference point. If a positive determination is made, the position of the trigger area can be adjusted to remain stationary in the initial relative position at step 1510, thereby anchoring the trigger area to the fixed feature points.

In accordance with an embodiment, outlier removal logic, and trigger area tracking logic, may be performed with respect to each captured frame. Outlier removal logic, and trigger area tracking logic, may be performed after feature detection and tracking logic has been performed on each captured frame. By performing outlier removal logic and trigger area tracking logic after feature detection and tracking logic, feature point information that has been identified or updated by feature detection and tracking logic can be used in determinations made by outlier removal logic, and trigger area tracking logic.

Although the accompanying drawings depict certain steps of logical flows, it will be appreciated that, where possible, these steps may be performed in any order. The steps are depicted as exemplary flows, and not meant to limit the order in which disclosed steps may be performed in accordance with various embodiments.

Although certain embodiments have been shown and described, it is understood that equivalents and modifications falling within the scope of the appended claims will occur to others who are skilled in the art upon the reading and understanding of this specification.

What is claimed:

1. A digital camera comprising:
a control circuit that operatively controls the digital camera to:
track movement of an object within video frames captured by the digital camera, wherein the control circuit tracks movement of the object by tracking movement of a plurality of feature points within the video frames that correspond to the object;
determine that the object has moved inside the boundaries of a trigger area defined on a viewfinder of the digital camera; and
initiate slow-motion video capture in response to the determination that the object, as captured in the video frames, has moved inside the boundaries of the trigger area.

2. The digital camera of claim 1, wherein the video frames are processed according to a feature detection method, and the feature detection method identifies feature points that correspond to objects captured in the video frames.

3. The digital camera of claim 2, wherein a threshold number of feature points are required to be inside the boundaries of the trigger area to initiate slow-motion video.

4. The digital camera of claim 3, wherein the digital camera identifies the feature points as one of moving feature points or fixed feature points.

5. The digital camera of claim 4, wherein the threshold number of feature points is defined as including one of:
a percentage of the feature points identified as moving feature points; or
a minimum number of features points.

6. The digital camera of claim 4, wherein the digital camera positively identifies the object as a discrete set of the feature points identified as moving feature points, and wherein the threshold number of feature points is defined as a percentage of the discrete set.

7. The digital camera of claim 2, wherein the feature detection method comprises the features from accelerated segment test (FAST) corner detection method.

8. The digital camera of claim 7, wherein the feature point tracking method comprises the features from accelerated segment test (FAST) corner detection method.

9. The digital camera of claim 1, wherein the video frames are processed according to an optical flow method, and
wherein the optical flow method predicts the position of a lost feature point in a video frame where the feature point tracking method failed to identify the lost feature point.

10. The digital camera of claim 1, wherein the control circuit controls the camera to determine an initial position of the trigger area relative to a reference point.

11. The digital camera of claim 10, wherein the control circuit controls the camera to identify one or more of the feature points as outliers, and wherein the feature points identified as outliers are ignored in determining the threshold number of feature points.

12. The digital camera of claim 10, wherein the control circuit controls the camera to track the position of the trigger area; and
determine, based on the tracked position of the trigger area, that the trigger area is displaced from the initial position of the trigger area relative to the reference point.

13. The digital camera of claim 10, wherein the position of the trigger area is adjusted to reflect the initial position of the trigger area relative to the reference point.

14. The digital camera of claim 10, wherein the reference point is determined based on an at least one of the feature points identified as a fixed feature point.

15. A method carried out on a digital camera, the method comprising the steps of:
tracking movement of an object within video frames captured by the digital camera, wherein tracking movement of the object includes tracking movement of a plurality of feature points within the video frames that correspond to the object;
determining that the object has moved inside the boundaries of a trigger area defined on a viewfinder of the digital camera;
wherein a user of the digital camera defines the trigger area on the viewfinder of the digital camera through a user input; and
initiating slow-motion video capture in response to the determination that the object, as captured in the video frames, has moved inside the boundaries of the trigger area.

16. The method of claim 15, further comprising:
processing the video frames according to a feature detection method, wherein the feature detection method identifies feature points that correspond to objects captured in the video frames,
identifying the feature points as one of moving feature points or fixed feature points, and
defining a threshold number of feature points as including one of:
a percentage of the feature points identified as moving points, or
a minimum number of feature points,
wherein the threshold number of feature points are required to be inside the boundaries of the trigger area to initiate slow motion video.

17. The method of claim 15, further comprising:
determining an initial position of the trigger area relative to a reference point;
tracking the position of the trigger area;
determining, based on the tracked position of the trigger area, that the trigger area is displaced from the initial position of the trigger area relative to the reference point; and
adjusting the position of the trigger area to reflect the initial position of the trigger area relative to the reference point.

* * * * *